United States Patent
Li et al.

(10) Patent No.: US 12,328,768 B2
(45) Date of Patent: Jun. 10, 2025

(54) JOINT MSG3 REPETITION FACTOR AND TPC INDICATION

(71) Applicant: QUALCOMM Incorporated, San Diego, CA (US)

(72) Inventors: Qiaoyu Li, Beijing (CN); Wanshi Chen, San Diego, CA (US); Umesh Phuyal, San Diego, CA (US); Jing Lei, San Diego, CA (US); Chao Wei, Beijing (CN); Peter Pui Lok Ang, San Diego, CA (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 319 days.

(21) Appl. No.: 17/775,009

(22) PCT Filed: Dec. 1, 2020

(86) PCT No.: PCT/CN2020/133049
§ 371 (c)(1),
(2) Date: May 6, 2022

(87) PCT Pub. No.: WO2021/115157
PCT Pub. Date: Jun. 17, 2021

(65) Prior Publication Data
US 2022/0369379 A1    Nov. 17, 2022

(30) Foreign Application Priority Data
Dec. 13, 2019  (WO) ................ PCT/CN2019/125034

(51) Int. Cl.
H04W 74/0833   (2024.01)
(52) U.S. Cl.
CPC .............. H04W 74/0833 (2013.01)

(58) Field of Classification Search
CPC ................................................. H04W 74/0833
(Continued)

(56) References Cited

U.S. PATENT DOCUMENTS 10,327,265 B2   6/2019  Ly et al.
2019/0342921 A1*  11/2019  Loehr ................... H04L 5/0044
(Continued)

FOREIGN PATENT DOCUMENTS

| CN | 104811995 A | 7/2015 |
|----|-------------|--------|
| CN | 105794297 A | 7/2016 |

(Continued)

OTHER PUBLICATIONS

Ericsson: "Remaining Issues on Random Access for Rel-13 Low Complexity and Enhanced Coverage UEs", 3GPP TSG-RAN WG2 #92, Tdoc R2-156774, Anaheim, USA, Nov. 16, 2015-Nov. 20, 2015, 11 Pages, Nov. 20, 2015 (Nov. 20, 2015) the whole document.

(Continued)

*Primary Examiner* — Nicholas R Taylor
*Assistant Examiner* — Chong G Kim
(74) *Attorney, Agent, or Firm* — ArentFox Schiff LLP

(57) ABSTRACT

A user equipment (UE) operating as an NR-Light UE may repeat transmissions of uplink signals such as a random access (RA) message (Msg) 3 on a physical uplink shared channel (PUSCH) during a random access channel (RACH) procedure. The UE may receive a random access response (RAR) message including a RAR uplink (UL) grant. The UE may determine, based on a single bit of the RAR message, whether repetition of a RA Msg 3 is indicated. The UE may determine both of a repetition factor and a transmit power control (TPC) command for the RA Msg 3 based on a TPC field of the RAR UL grant. The UE may transmit the RA Msg 3 based on the repetition factor and the TPC command.

27 Claims, 9 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2019/0363843 A1 | 11/2019 | Gordaychik | |
| 2020/0120709 A1* | 4/2020 | Bergquist | H04W 72/23 |
| 2021/0022190 A1* | 1/2021 | Zhao | H04L 5/0094 |
| 2021/0076384 A1* | 3/2021 | MolavianJazi | H04B 17/318 |
| 2021/0235503 A1* | 7/2021 | Irukulapati | H04L 1/08 |
| 2021/0274550 A1* | 9/2021 | Zhang | H04W 80/02 |
| 2022/0039068 A1* | 2/2022 | Hoglund | H04W 76/20 |

FOREIGN PATENT DOCUMENTS

| | | |
|---|---|---|
| CN | 106416411 A | 2/2017 |
| CN | 107210903 A | 9/2017 |
| CN | 108260108 A | 7/2018 |
| WO | 2018084995 A1 | 5/2018 |
| WO | 2019213978 A1 | 11/2019 |
| WO | 2019216818 A1 | 11/2019 |

OTHER PUBLICATIONS

Ericsson: "Solutions to Coverage Issues for Msg3 Transmissions", 3GPP TSG-RAN WG2 #102, R2-1807028, May 25, 2018 (May 25, 2018), pp. 1-4, the whole document.
International Search Report and Written Opinion—PCT/CN2019/125034—ISAEPO—Sep. 16, 2020.
International Search Report and Written Opinion—PCT/CN2020/133049—ISA/EPO—Feb. 26, 2021.
Mediatek Inc: "Paging Message Design for Rel-13 LC/CE UEs", 3GPP TSG RAN WG1 Meeting #82, R1-154713, Beijing, China, Aug. 24, 2015-Aug. 28, 2015, 5 Pages, Aug. 28, 2015 (Aug. 28, 2015), sections 1-2.
Supplementary European Search Report—EP20899680—Search Authority—Munich—Nov. 28, 2023.

* cited by examiner

JOINT MSG3 REPETITION FACTOR AND TPC INDICATION

CROSS-REFERENCE TO RELATED APPLICATIONS

This application is a 35 U.S.C. § 371 National Phase Application of PCT Application No. PCT/CN2020/133049 filed Dec. 1, 2020, entitled "JOINT MSG3 REPETITION FACTOR AND TPC INDICATION," which claims priority to PCT Application Number PCT/CN2019/125034 titled "JOINT MSG3 REPETITION FACTOR AND TPC INDICATION," filed Dec. 13, 2019, which is assigned to the assignee hereof. The disclosures of these prior applications are hereby incorporated by reference herein in their entirety.

BACKGROUND

Technical Field

The present disclosure relates generally to communication systems, and more particularly, to an indication of a repetition factor and transmit power control (TPC) command for a random access message 3 (RA Msg 3).

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus for a user equipment (UE) are provided. The method may include receiving a random access response (RAR) message including a RAR uplink (UL) grant. The method may include determining, based on a single bit of the RAR message, whether repetition of a random access (RA) message (Msg) 3 is indicated. The method may include determining both of a repetition factor and a transmit power control (TPC) command for the random access message based on the single bit and a TPC field of the RAR UL grant. The method may include transmitting the RA Msg 3 based on the repetition factor and the TPC command.

In another aspect, the disclosure provides an apparatus for wireless communication. The apparatus may include a memory and at least one processor coupled to the memory. The processor may be configured to receive a random access response (RAR) message including a RAR uplink (UL) grant. The processor may be configured to determine, based on a single bit of the RAR message, whether repetition of a RA Msg 3 is indicated. The processor may be configured to determine both of a repetition factor and a transmit power control (TPC) command for the RA Msg 3 based on the single bit and a TPC field of the RAR UL grant. The processor may be configured to transmit the RA Msg 3 based on the repetition factor and the TPC command.

In another aspect, the disclosure provides an apparatus for wireless communication. The apparatus may include means for receiving a random access response (RAR) message including an uplink (UL) grant. The apparatus may include means for determining, based on a single bit of the RAR message, whether repetition of a RA Msg 3 is indicated. The apparatus may include means for determining both of a repetition factor and a transmit power control (TPC) command for the RA Msg 3 based on the single bit and a TPC field of the RAR UL grant. The apparatus may include means for transmitting the RA Msg 3 based on the repetition factor and the TPC command.

In another aspect, the disclosure provides a non-transitory computer-readable medium storing computer executable code. The code when executed by a processor causes the processor to receive a random access response (RAR) message including an uplink (UL) grant. The code when executed by a processor causes the processor to determine, based on a single bit of the RAR message, whether repetition of a RA Msg 3 is indicated. The code when executed by a processor causes the processor to determine both of a repetition factor and a transmit power control (TPC) command for the RA Msg 3 based on the single bit and a TPC field of the RAR UL grant. The code when executed by a processor causes the processor to transmit the RA Msg 3 based on the repetition factor and the TPC command.

In an aspect of the disclosure, a method, a computer-readable medium, and an apparatus for a base station are provided. The method may include receiving a random access preamble from a UE. The method may include transmitting a physical downlink shared channel transport block including a RAR message including a single bit indication of whether repetition of a RA Msg 3 is indicated and an UL grant including a TPC field indicating both a repetition factor and a TPC command. The method may include receiving the RA Msg 3 based on the repetition factor and the TPC command.

In another aspect, the disclosure provides an apparatus for wireless communication. The apparatus may include a memory and at least one processor coupled to the memory. The processor may be configured to receive a random access preamble from a UE. The processor may be configured to a physical downlink shared channel transport block including a RAR message including a single bit indication of whether repetition of a RA Msg 3 is indicated and an UL grant including a TPC field indicating both a repetition factor and a TPC command. The processor may be configured to receive the RA Msg 3 based on the repetition factor and the TPC command.

In another aspect, the disclosure provides an apparatus for wireless communication. The apparatus may include means for receiving a random access preamble from a UE. The apparatus may include means for transmitting a physical downlink shared channel transport block including a RAR message including a single bit indication of whether repetition of a RA Msg 3 is indicated and an UL grant including a TPC field indicating both a repetition factor and a TPC command. The apparatus may include means for receiving the RA Msg 3 based on the repetition factor and the TPC command.

In another aspect, the disclosure provides a non-transitory computer-readable medium storing computer executable code. The code when executed by a processor causes the processor to receive a random access preamble from a UE. The code when executed by a processor causes the processor a physical downlink shared channel transport block including a RAR message including a single bit indication of whether repetition of a RA Msg 3 is indicated and an UL grant including a TPC field indicating both a repetition factor and a TPC command. The code when executed by a processor causes the processor to receive the RA Msg 3 based on the repetition factor and the TPC command.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
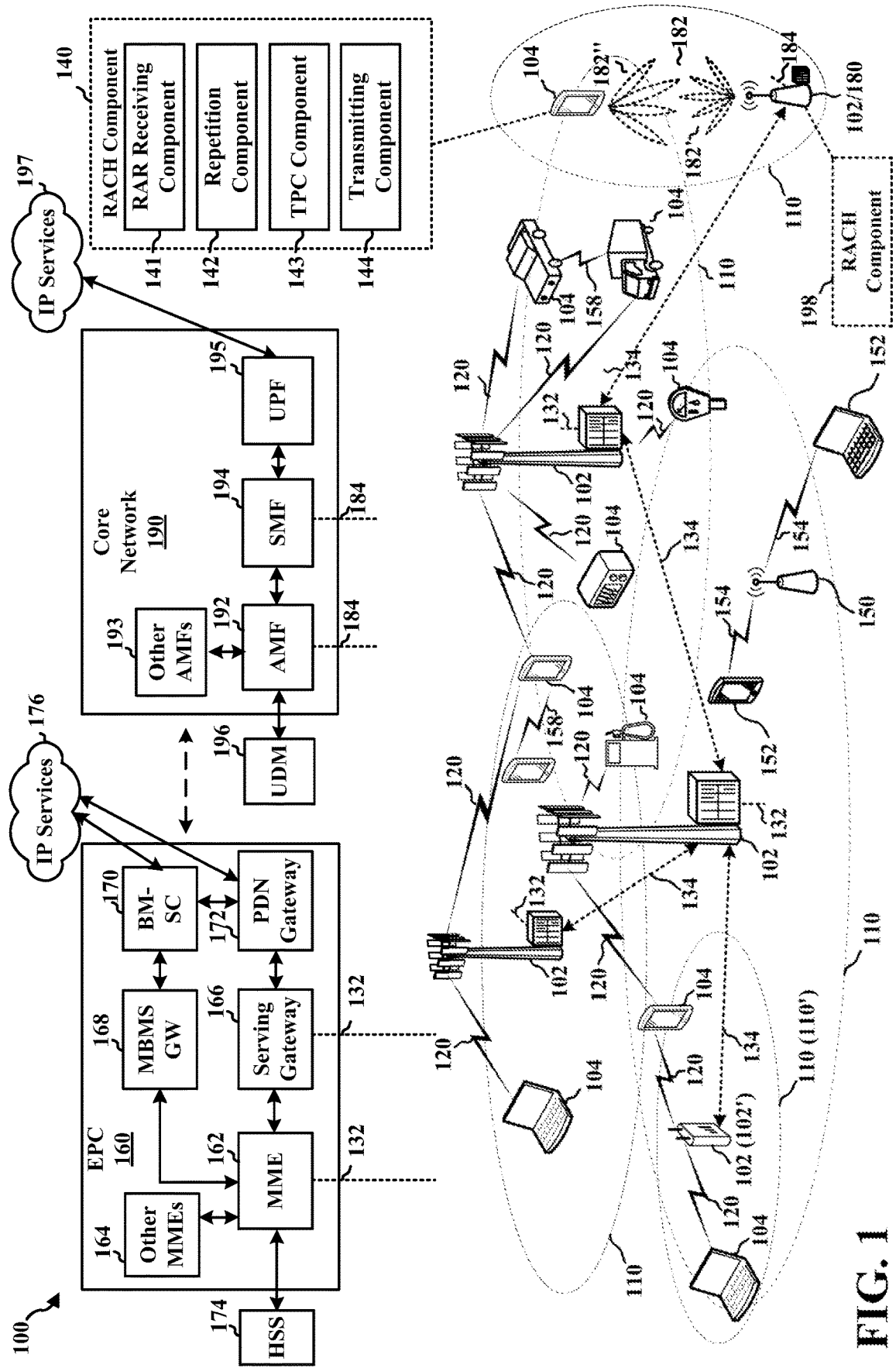
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

5G NR provides high throughout and low latency utilizing wide bandwidths (e.g., eMBB). Not all devices, however, have requirements for high throughput. For some devices, lower cost and reduced power consumption may be more beneficial than higher throughput or lower latency. Lower performance may be acceptable for devices such as smart wearable devices, industrial sensors, and surveillance devices. A NR-Light UE may be a UE that uses 5G NR technology, but is designed for these lower performance devices. A NR-Light UE may have reduced transmit power. For example, uplink transmit power may be as much as 10 dB less than an eMBB UE. An NR-Light UE may include a single transmit antenna. Further, bandwidth may be reduced compared to an eMBB UE. For example, an NR-Light UE may operate on bandwidth between 5 MHz and 20 MHz for both transmit and receive directions. An NR-Light UE may include a single receive antenna, which may result in a lower equivalent receive signal to noise ratio (SNR). An NR-Light UE may also have reduced computational complexity compared to an eMBB UE.

In an aspect, transmissions for an NR-Light UE may be repeated to improve reliability. The repetitions may compensate for the reduced number of antennas in the downlink and the reduced number of antennas and limited transmit power in the uplink. A receiver may combine the multiple transmissions for improved decoding.

A random access channel (RACH) procedure may present difficulties for an NR-Light UE because the NR-Light UE may not yet be connected to the base station, but may need to be scheduled with extra slots in order to repeat uplink RACH messages. In particular, the random access (RA) message (Msg) 3 is an uplink transmission that may be repeated by an NR-Light UE. In an aspect, the present disclosure provides techniques for scheduling and transmitting the RA Msg 3 at the physical layer with repetitions without major changes at higher layers. Accordingly, an NR-Light UE may operate within a 5G NR system.

In an aspect, a base station may transmit and a UE may receive a random access response (RAR) message, which may also be referred to as RACH message 2. The RAR message may include an RAR UL grant, which may be parsed by the higher layers and provided to the physical layer for transmission of the RA message 3. The UE may determine whether the RAR UL grant indicates repetition of a RA Msg 3 based on a single bit of the RAR UL grant. If no repetition is indicated, the UE may interpret all bits of a transmit power control (TPC) field of the RAR UL grant as a TPC command. If repetition is indicated, the UE may interpret a first bit of the TPC field to indicate whether the repetition factor is 2. If the repetition factor is 2, the UE may interpret the remaining bits of the TPC field as a TPC command. If the repetition factor is not 2, the UE may transmit with maximum power and interpret the remaining bits of the TPC field as a repetition factor. Accordingly, the UE may interpret the TPC command to determine both the repetition factor and the TPC command. The UE may then transmit the RA Msg 3 based on the repetition factor and the TPC command.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

In an aspect, one or more of the UEs 104 may include a RACH component 140 configured to perform a RACH procedure including transmitting a RA Msg 3. The RACH component 140 may include a RAR receiving component configured to receive a RAR message including a RAR UL grant; a repetition component 142 configured to determine, based on a single bit of the RAR message, whether repetition of a RA Msg 3 is indicated; a TPC component 143 configured to determine both of a repetition factor and TPC command for the RA Msg 3 based on the single bit and a TPC field of the RAR UL grant; and a transmitting component 144 configured to transmit the RA Msg 3 based on the repetition factor and TPC command.

In an aspect, one or more of the base stations 102 may include a RACH component 198. In an implementation, the RACH component 198 at the base station 102 is configured to receive a random access preamble from a UE; transmit a physical downlink shared channel (PDSCH) transport block including a RAR UL grant including a single bit indication of whether repetition of a RA Msg 3 is indicated and a TPC field indicating both a repetition factor and a TPC command; and receive the RA Msg 3 based on the repetition factor and the transmit power command.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL)

(also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
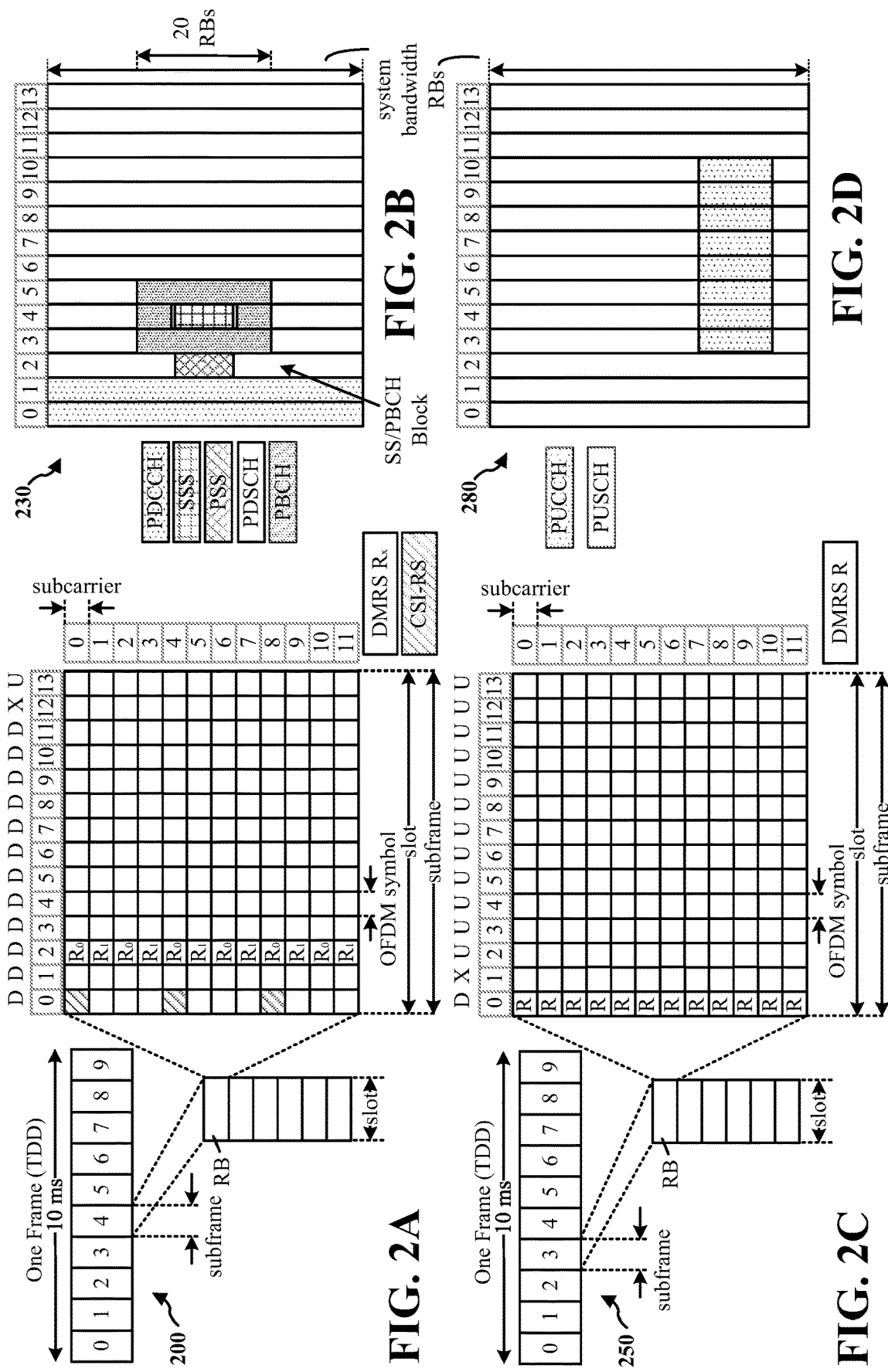
FIG. 2A is a diagram illustrating an example of a first frame.
FIG. 2B is a diagram illustrating an example of DL channels within a subframe.
FIG. 2C is a diagram illustrating an example of a second frame.
FIG. 2D is a diagram illustrating an example of a UL channels within a subframe.

Referring to FIGS. 2A, 2B, 2C, and 2D, different example frame structures and/or resources may be utilized in base stations 102 and/or UE 104. FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and 2µ slots/subframe. The subcarrier spacing and symbol length/duration are a function of the numerology. The subcarrier spacing may be equal to $2^\mu*15$ kHz, where µ is the numerology 0 to 5. As such, the numerology µ=0 has a subcarrier spacing of 15 kHz and the numerology µ=5 has a subcarrier spacing of 480 kHz. The symbol length/duration is inversely related to the subcarrier spacing. FIGS. 2A-2D provide an example of slot configuration 0 with 14 symbols per slot and numerology µ=0 with 1 slot per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where $100x$ is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
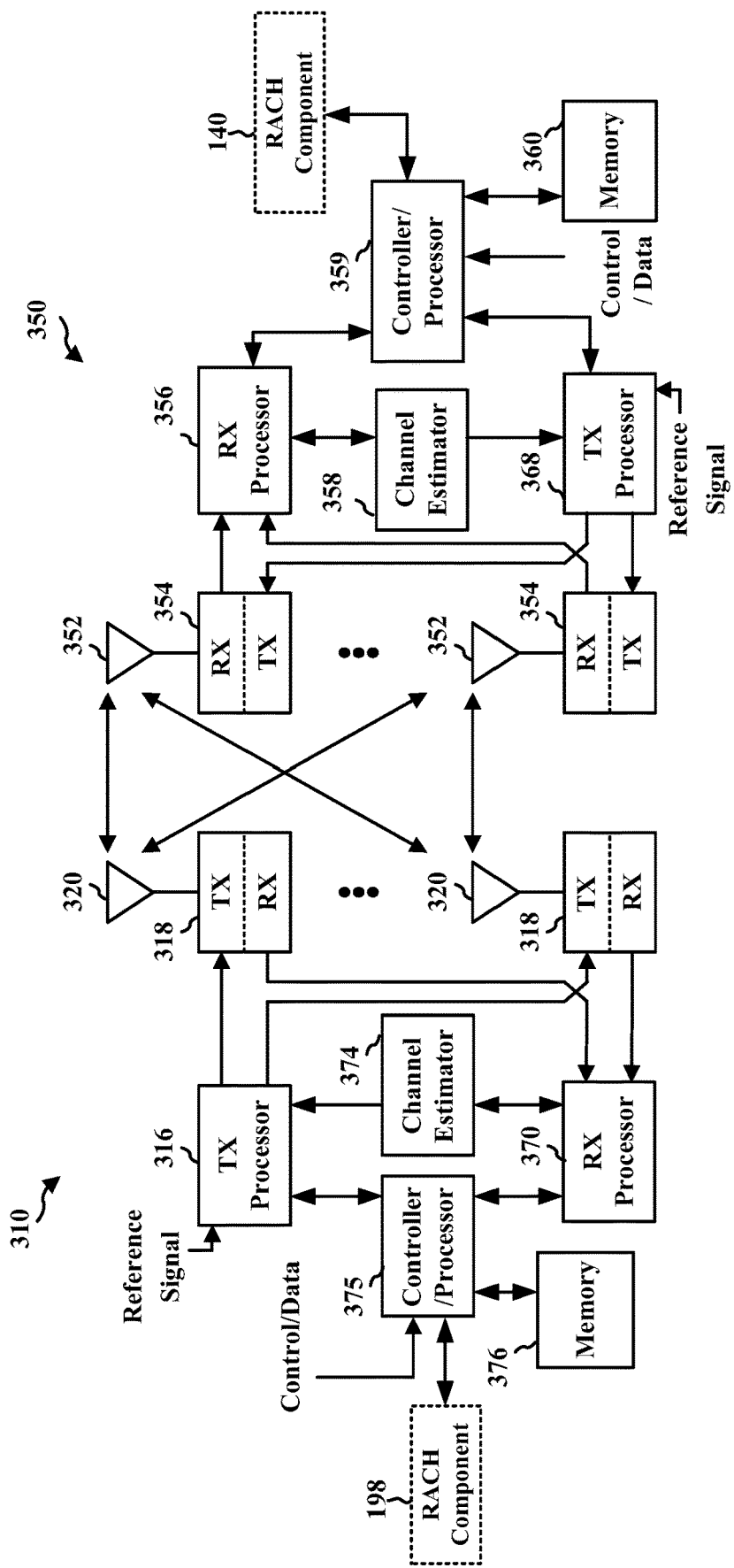
FIG. 3 is a diagram illustrating an example of a base station and user equipment (UE) in an access network.

FIG. 3 is a block diagram of a base station 310 in communication with a UE 350 in an access network, where base station 310 may be the same as or similar to base station 102, e.g., including RACH component 198, and UE 350 may be the same as or similar to UE 104, e.g., including RACH component 140. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and de-interleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the RACH component 140 of FIG. 1.

At least one of the TX processor 316, the RX processor 370, and the controller/processor 375 may be configured to perform aspects in connection with the RACH component 198 of FIG. 1.

Figure 4:
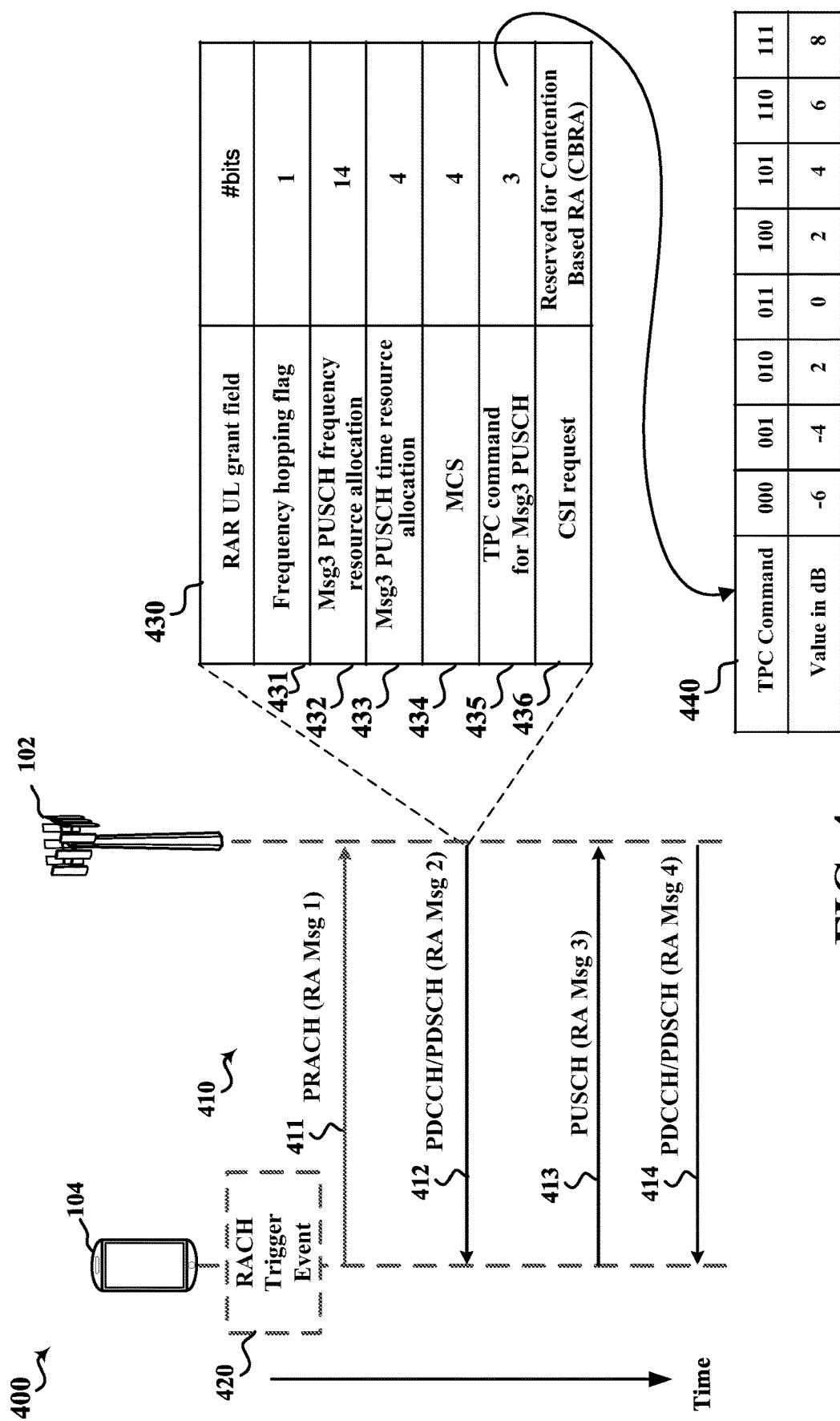
FIG. 4 is a message diagram illustrating an example message exchange between a base station and a user equipment (UE) in an access network.

FIG. 4 is a diagram 400 illustrating an example message exchange between a base station 102 and a user equipment (UE) 104 in an access network. The UE 104 may be an NR-Light UE and include a RACH component 140. The base station 102 may include a RACH component 198.

Referring additionally to Table 1 (below), during operation, UE 104 may execute an implementation of an NR RACH procedure 410, according to a 4-step NR RACH message flow, due to one the occurrence of one or more RACH trigger events 420. Suitable examples of RACH trigger event 420 may include, but are not limited to: (i) an initial access from RRC_IDLE to RRC_CONNECTED ACTIVE; (ii) downlink (DL) data arrival during RRC_IDLE or RRC_CONNECTED INACTIVE; (iii) UL data arrival during RRC_IDLE or RRC_CONNECTED INACTIVE; (iv) a handover during the connected mode of operation; and (v) a connection re-establishment (e.g., a beam failure recovery procedure).

The NR RACH procedure 410 may be associated with a contention based random access procedure, or with a contention free random access procedure. In an implementation, a contention based NR RACH procedure corresponds to the following RACH trigger events 420: an initial access from RRC_IDLE to RRC_CONNECTED ACTIVE; UL data arrival during RRC_IDLE or RRC_CONNECTED INACTIVE; and, a connection re-establishment. In an implementation, a contention-free NR RACH procedure corresponds to the following RACH trigger events 420: downlink (DL) data arrival during RRC_IDLE or RRC_CONNECTED INACTIVE; and, a handover during the connected mode of operation.

On the occurrence of any of the above RACH trigger events 420, the execution of the NR RACH procedure 410 may include the 4-step NR RACH message flow (see FIG. 4 and Table 1), where UE 104 exchanges messages with one or more base stations 102 to gain access to a wireless network and establish a communication connection. The messages may be referred to as random access (RA) messages (Msg) 1 to 4, or may alternatively be referred to by the PHY channel carrying the message (e.g., message 3 PUSCH).

TABLE 1

NR RACH procedure, including Messages and Message Content transmitted over corresponding Physical (PHY) channel(s).

| PHY Channel | Message | Message content |
|---|---|---|
| PRACH | RA Msg 1 | Random Access Preamble |
| PDCCH/ PDSCH | RA Msg 2 | Random Access Response (RAR): Detected RACH preamble ID, TA, TC-RNTI, backoff indicator, UL/DL grants |
| PUSCH | RA Msg 3 | First UL scheduled transmission: RRC Connection request (or scheduling request and tracking area update) |
| PDCCH/ PDSCH | RA Msg 4 | Contention resolution message |

In a first step of a RACH procedure, for example, UE 104 may transmit a message (RA Msg 1) 411, which may be referred to as a random access request message, to one or more base stations 102 via a physical channel, such as a physical random access channel (PRACH). For example, RA Msg 1 411 may include one or more of a RACH preamble and a resource requirement. The UE 104 may transmit the Msg 1 410 during a random access opportunity (RO). In an aspect, the RACH preamble may be a relatively long preamble sequence, which may be easier for the base station 102 to receive than an OFDM symbol.

In a second step, the base station 102 may respond to receiving Msg 1 411 by transmitting a second message (Msg 2) 412, which may be referred to as a random access response (RAR) message, over a physical downlink control channel (e.g., PDCCH) portion and a physical downlink shared channel (e.g., PDSCH) portion. For example, RA Msg 2 412 may include one or more of a detected preamble identifier (ID), a timing advance (TA) value, a temporary cell radio network temporary identifier (TC-RNTI), a backoff indicator, an UL grant, and a DL grant. In an aspect, the RAR receiving component 141 at the UE 104 may receive the RAR message. The RAR receiving component 141 may monitor the PDCCH during a monitoring window based on the RA Msg 1 411 to detect DCI format 1_0 with CRC scrambled by the corresponding RA-RNTI and a transport block in a corresponding PDSCH within the window. The RAR receiving component 141 may pass the transport block to higher layers, which may parse the transport block for a random access preamble identity (RAPID) associated with the PRACH transmission. If the higher layers identify the RAPID in RAR message(s) of the transport block, the higher layers indicate an uplink grant to the RAR receiving component 141 at the physical layer. This is referred to as RAR UL grant in the physical layer. The RAR UL grant may be represented as a RAR UL grant field 430. As illustrated, the RAR UL grant field 430 may include a frequency hopping flag 431, a RA Msg 3 frequency resource allocation 432, a RA Msg 3 time resource allocation 433, a modulation and coding scheme (MCS) indication 434, a TPC command 435 for Msg 3, and a CSI request 436. The TPC command 435 may be a field of, for example, 3 bits. The three bits may be referred to as the TPC command 440. The UE 104 may interpret the TPC command 440 to determine a TPC value in dB, which may be used for power control of the RA Msg 3. For example, as illustrated, the TPC command 440 may correspond to values between −6 dB and 8 dB, which may indicate a change from a transmit power used for the RA Msg 1 411.

In response to receiving Msg 2 412, the UE 104 transmits to the base station 102 a third message (Msg 3) 440, which may be a first uplink scheduled transmission such as an RRC connection request or a scheduling request, via a physical uplink channel (e.g., PUSCH) based on the RAR UL grant provided in RA Msg 2 412 of a selected serving base station 102. In an aspect, as described in further detail below with respect to FIG. 5, the RA Msg 3 413 may be based on OFDM symbols and may contain a relatively larger payload than the RA Msg 1 411. Accordingly, since an NR-Light UE has relatively low transmission power, repetition of the RA Msg 3 413 may improve reception of the RA Msg 3 413 at a base station 102. In an aspect, the RACH component 140 may determine whether to repeat the RA Msg 3 413 based on the RAR UL grant.

In response to receiving Msg 3 413, the base station 102 may transmit a fourth message (RA Msg 4) 414, which may be referred to as a contention resolution message, to UE 104 via a physical downlink control channel (e.g., PDCCH) and a physical downlink shared channel (e.g., PDSCH). For example, RA Msg 4 414 may include a cell radio network temporary identifier (C-RNTI) for UE 104 to use in subsequent communications.

In some example scenarios, a collision between two or more UEs 104 requesting access in a RO can occur. For instance, two or more UEs 104 may send RA Msg 1 411 having a same RACH preamble, since the number of RACH preambles may be limited and may be randomly selected by each UE 104 in a contention-based NR RACH procedure. As such, each UE 104 will receive the same temporary C-RNTI and the same UL grant, and thus each UE 104 may send a similar RA Msg 3 413. In this case, base station 102 may resolve the collision in one or more ways: (i) both RA Msg 3 413 may interfere with each other, and so base station 102 may not send RA Msg 4 414, thus each UE 104 will retransmit RA Msg 1 411; (ii) base station 102 may successfully decode only one RA Msg 3 413 and send an ACK message to that UE; and (iii) base station 102 may successfully decode both RA Msg 3s 413, and then send a RA Msg 4 414 having a contention resolution identifier (e.g., an identifier tied to one of the UEs) to both UEs, and each UE 104 receives the RA Msg 4 414, decodes the RA Msg 4 414, and determines if the UE 104 is the correct UE by successfully matching or identifying the contention resolution identifier. It should be noted that such a problem may not occur in a contention-free NR RACH procedure, as in that case, base station 102 may inform UE 104 of which RACH preamble to use.

Figure 5:
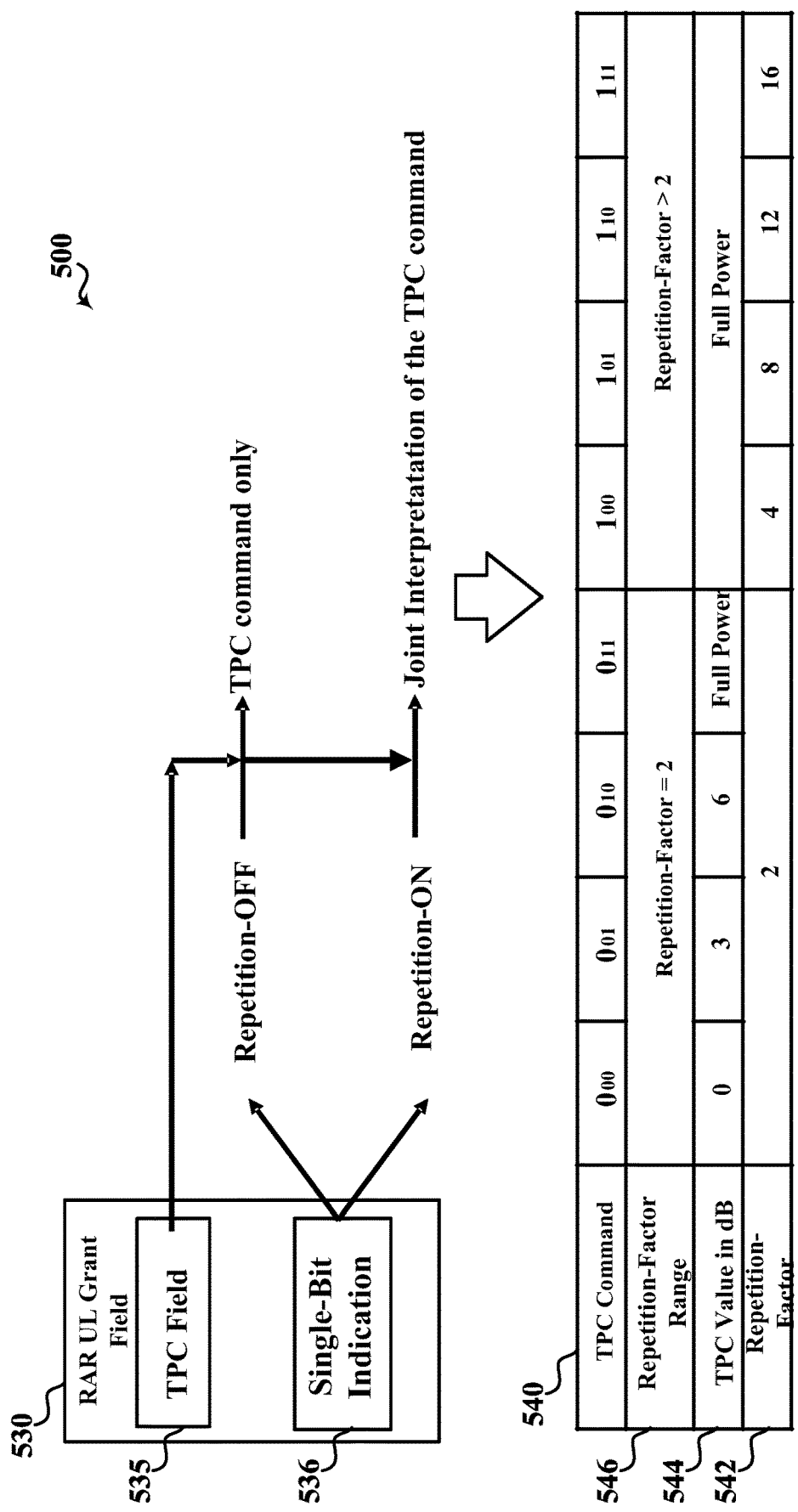
FIG. 5 is a diagram illustrating an example interpretation of a RAR uplink grant field.

FIG. 5 is a diagram 500 showing an interpretation of a RAR UL grant field 530 for an NR-Light UE including the RACH component 140. In an aspect, the RAR UL grant field 530 may be similar or the same as the RAR UL grant field 430. That is, the RAR UL grant field 530 may be the same size (27 bits) as the RAR UL grant field 430. Accordingly, the RAR UL grant field 530 may be processed by higher layers in the same manner as the RAR UL grant field 430. In another aspect, the RAR UL grant field 530 may be 1 bit larger than the RAR UL grant field 430 to accommodate a new single bit indication. Only the TPC field 535 and the single-bit indication 536 are shown in RAR UL grant field 530, which may include all of the fields of RAR UL grant field 430. The TPC field 535 may correspond to the field for the TPC command 435 and may be the same size (e.g., 3 bits). The single-bit indication 536 may be a 1 bit field of the RAR UL grant field 530. In an aspect, the single-bit indication 536 may correspond to the CSI request 436, which may be a single bit that is only used for contention-based random access. The use of the CSI request 436 as the single-bit indication 536 may introduce no changes to upper layer processing as the number and location of the bits may remain the same. The RA Msg 3 may be scheduled for contention-free random access, where the CSI request 436 is not utilized. In another aspect, the single-bit indication 536 may be an additional field of the RAR UL grant field 530. Although the additional field may introduce changes in upper layer processing, the additional field may guarantee that no additional efforts to schedule repeated RA Msg 3 in contention-free random access are needed.

In an aspect, the repetition component 142 may determine, based the single-bit indication 536, whether repetition of the RA Msg 3 is indicated. For example, the single-bit indication 536 having a value of 1 may indicate repetition (Repetition-ON) of the RA Msg 3 and the single-bit indication 536 having a value of 0 may indicate no repetition (Repetition-OFF) of the RA Msg 3. When the single-bit indication 536 indicates Repetition-OFF, the TPC component 143 may interpret the TPC field 535 as a TPC command only. The TPC component 143 may determine that the repetition factor is 1 when the single-bit indication 536 indicates Repetition-OFF. For example, the TPC component 143 may interpret the TPC field 535 as the TPC command 440.

When the single-bit indication 536 indicates Repetition-ON, the TPC component 143 may perform a joint interpretation of the TPC field 535 as a TPC command 540 indicating both a repetition factor 542 and a TPC value 544. For example, the TPC component 143 may interpret one bit (e.g., the first bit) of the TPC command 540 as a repetition factor range 546. For example, the first bit of the TPC command 540 being 0 may indicate a repetition factor range of 2, and the first bit of the TPC command 540 being 1 may indicate a repetition factor range greater than 2.

When the base station 102 receives the PRACH message 1, the base station 102 may determine an amount of repetition for the RA Msg 3 based on the SNR of the PRACH message 1. When the SNR is relatively high, the base station 102 may determine that only a repetition factor of 2 is needed, and the base station 102 may also determine that the UE 104 does not need to transmit the RA Msg 3 at full power. For example, if power loss for the NR-Light UE compared to an eMBB UE is less than 3 dB, repeating 2 times may not require full power transmission at each instance. Accordingly, when the first bit indicates a repetition factor range of 2, the remaining bits (e.g., 2 bits) of the TPC command 540 may be interpreted as a TPC value. For example, the remaining bits may indicate one of 4 TPC values ranging from 0 dB to full power.

In contrast, when the SNR is relatively low (e.g., due to greater power loss), the base station 102 may determine that a higher repetition factor is needed and the UE 104 should transmit at maximum power to increase likelihood of correct reception. Accordingly, when the repetition factor is greater than 2, the TPC component 143 may determine a TPC value 544 of full power and interpret the remaining bits of the TPC command 540 as a value of the repetition factor 542. For instance, the remaining bits may indicate one of 4 repetition factor values ranging from 4 to 16 (e.g., 4, 8, 12, or 16).

The values for the TPC command 540, repetition factor range 546, TPC value 544, and repetition factor 542 are provided as examples. Alternative mappings of bits to values may be used. In an aspect, the mapping of the bits to values, similar to the mapping illustrated in FIG. 5, may be defined in a standards document, regulation, and/or via system information. Accordingly, both the UE 104 and the base station 102 may be configured with the mappings prior to the transmission of the RAR UL grant.

Figure 6:
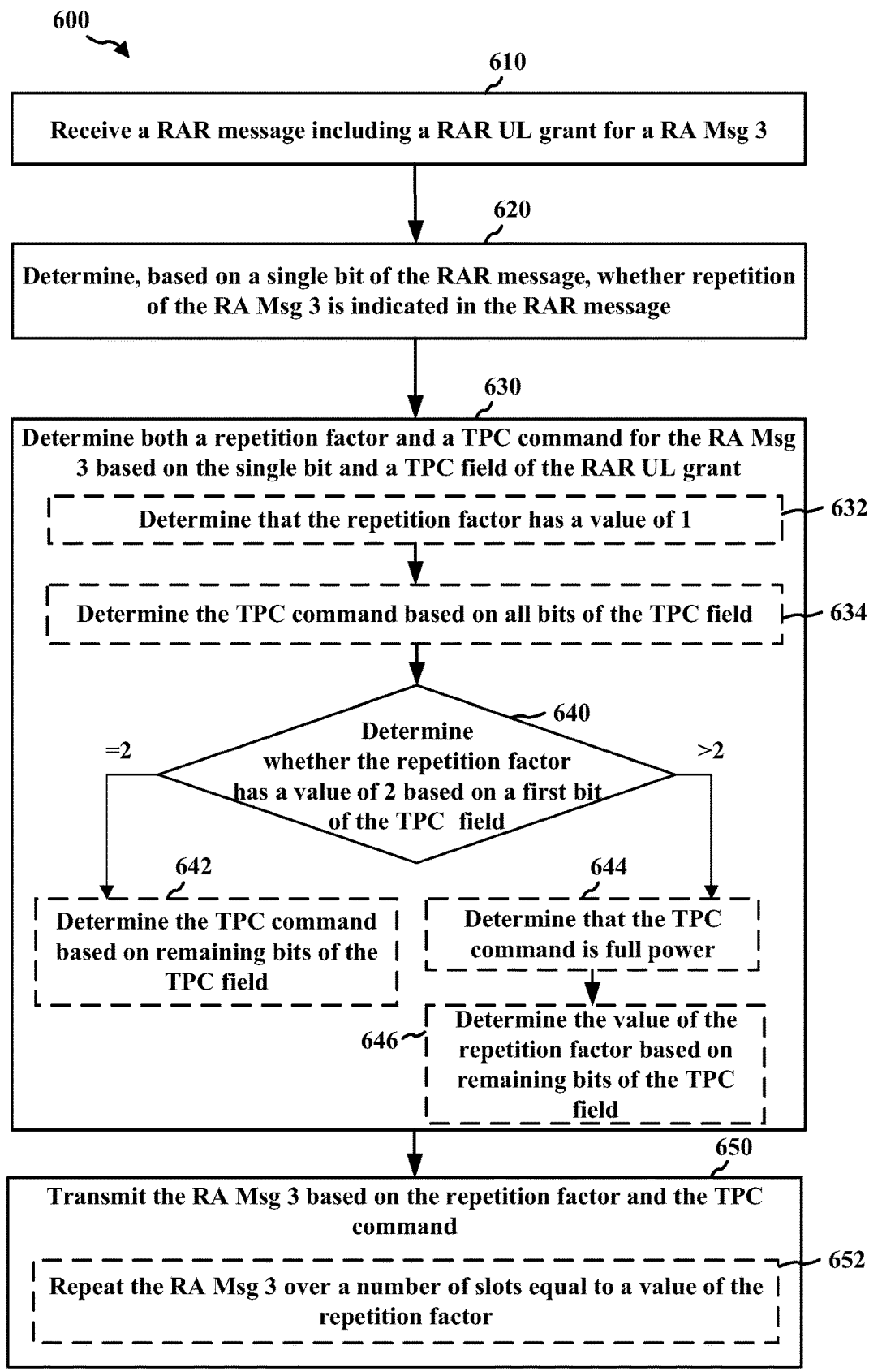
FIG. 6 is a flowchart of an example method for transmitting a RACH message 3.

FIG. 6 is a flowchart of an example method 600 for transmitting a RA Msg 3 during a RACH procedure. The method 600 may be performed by a UE (such as the UE 104, which may include the memory 360 and which may be the entire UE 104 or a component of the UE 104 such as the RACH component 140, TX processor 368, the RX processor 356, or the controller/processor 359). The method 600 may be performed by the RACH component 140 in communication with the RACH component 198 of the base station 102.

At block 610, the method 600 may include receiving a RAR message including a RAR UL grant. In an aspect, for example, the UE 104, or the controller/processor 359 may execute the RACH component 140 and/or the RAR receiving component 141 to receive the RAR message 412 including the RAR UL grant field 430. For example, the RAR receiving component 141 may receive a PDCCH, determine that a CRC of a DCI on the PDCCH is scrambled with a RA-RNTI, determine a corresponding PDSCH transport block, pass the transport block to higher layers, and receive the RAR UL grant from the higher layers. Accordingly, the UE 104, RX processor 356 or the controller/processor 359 executing the RACH component 140 or the RAR receiving component 141 may provide means for receiving the RAR UL grant.

At block 620, the method 600 may include determining, based on a single bit of the RAR message, whether repetition of a RA Msg 3 is indicated. In an aspect, for example, the UE 104, or the controller/processor 359 may execute the RACH component 140 and/or the repetition component 142 to determine, based on a single bit (e.g., single-bit indication 536) of the RAR message 412, whether repetition of a RA Msg 3 is indicated. For example, repetition may be indicated when the value of the single bit is 1 and no repetition may be indicated when the value of the single bit is 0. The mapping of the single bit value to the indication of repetition may be defined, for example, in a standard, regulation, or by system information. Accordingly, the UE 104, RX processor 356 or the controller/processor 359 executing the RACH component 140 or the RAR receiving component 141 may provide means for determining, based on a single bit of the RAR UL grant, whether repetition of a RA Msg 3 is indicated.

At block 630, the method 600 may include determining both of a repetition factor and a TPC command for the RA Msg 3 based on the single bit and a TPC field of the RAR UL grant. In an aspect, for example, the UE 104, or the controller/processor 359 may execute the RACH component 140 and/or the TPC component 143 to determine both of a repetition factor and a TPC command for the RA Msg 3 based on the single bit and a TPC field of the RAR UL grant. For example, at sub-block 632, the TPC component 143 may optionally determine that the repetition factor has a value of 1 when the single bit indicates no repetition. At sub-block 634, the TPC component 143 may determine the TPC command 440 based on all bits of the TPC field 535.

Alternatively, at sub-block 640, the block 630 may include determining whether the repetition factor has a value of 2 based on the first bit of the TPC field when repetition is indicated. For example, the TPC component 143 may determine that the repetition factor has a value of 2 when the first bit of the TPC field 535 is 0 and determine that the repetition factor has a value greater than 2 when the first bit of the TPC field 535 is 1. At sub-block 642, in response to determining that the repetition factor has a value of 2, the TPC component 143 may determine a value of the TPC command based on remaining bits of the TPC field. For example, the two remaining bits may indicate values of 0 dB, 3 dB, 6 dB, or Full Power. At sub-block 644, in response to determining that the repetition factor is greater than 2, the TPC component 143 may determine that the TPC command is full power. Further, at sub-block 646, also in response to determining that the repetition factor is greater than 2, the TPC component 143 may determine the value of the repetition factor based on remaining bits of the TPC field. For example, the two remaining bits may indicate values of 4, 8, 12, or 16. Accordingly, the UE 104, RX processor 356 or the controller/processor 359 executing the RACH component 140 or the TPC component 143 may provide means for determining both of a repetition factor and a TPC command for the RA Msg 3 based on a TPC field of the RAR UL grant.

At block 650, the method 600 may include transmitting the RA Msg 3 based on the repetition factor and transmit power command. In an aspect, for example, the UE 104, the controller/processor 359, and/or the TX processor 368 may execute the RACH component 140 and/or the transmitting component 144 to transmit the RA Msg 3 based on the repetition factor and transmit power command. The transmitting component 144 may apply the TPC command value to the transmit power of the RACH preamble to determine the transmit power for the RA Msg 3. The transmitting component 144 may repeat the message 3 based on the repetition factor. For example, at sub-block 652, the transmitting component 144 may repeat the RA Msg 3 over a number of slots equal to a value of the repetition factor. In an implementation, the number of slots equal to the value of the repetition factor may be consecutive slots. Accordingly, the UE 104, RX processor 356 or the controller/processor 359 executing the RACH component 140 or the RAR receiving component 141 may provide means for transmitting the RA Msg 3 based on the repetition factor and the transmit power control command.

Figure 7:
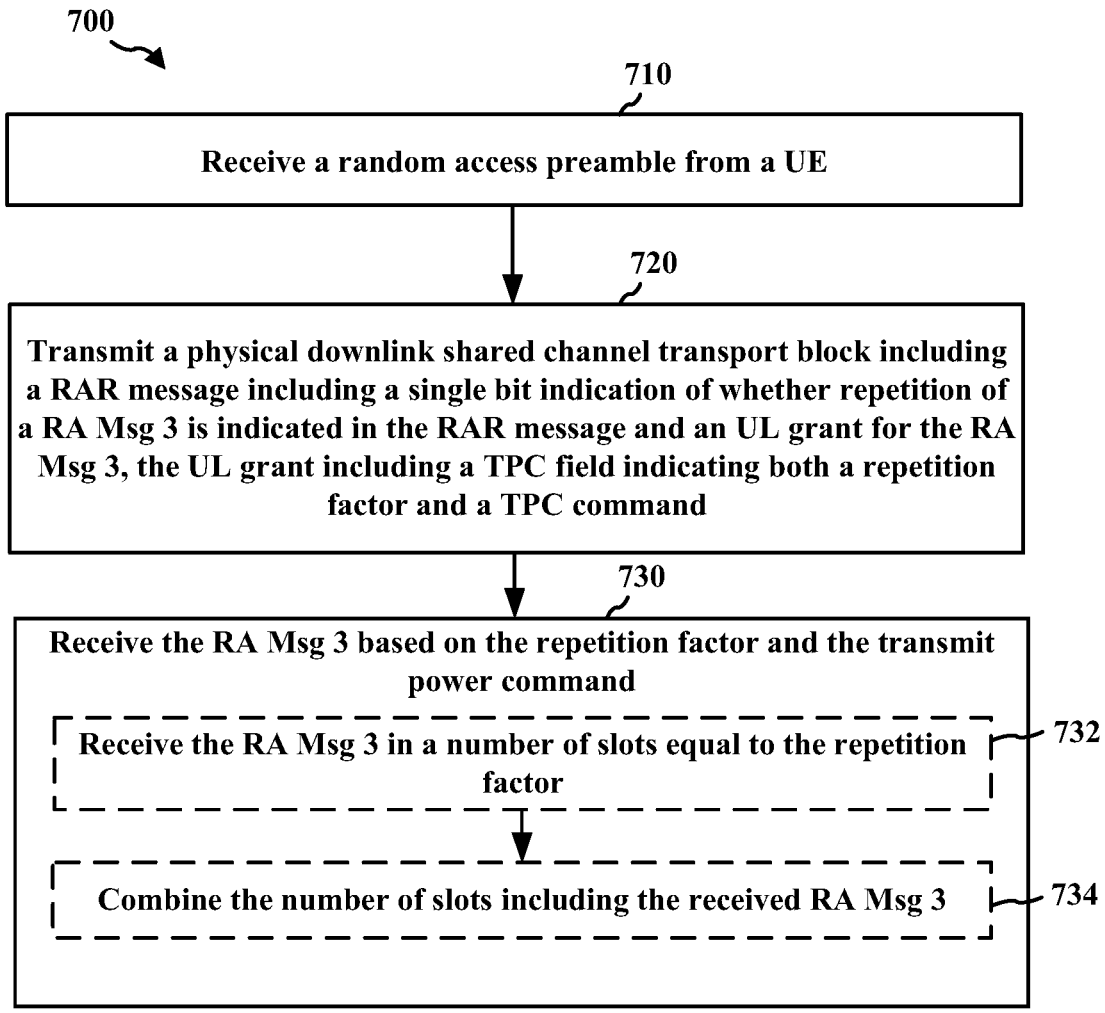
FIG. 7 is a flowchart of an example method of receiving a RACH message 3.

FIG. 7 is a flowchart of an example method 700 for receiving a RA Msg 3 during a RACH procedure. The method 700 may be performed by a base station (such as the base station 102, which may include the memory 376 and which may be the entire base station 102 or a component of the base station 102 such as the RACH component 198, TX processor 316, the RX processor 370, or the controller/processor 375). The method 700 may be performed by the RACH component 198 in communication with the RACH component 140 of the UE 104.

At block 710, the method 700 may include receiving a random access preamble from a UE. In an aspect, for example, the base station 102, the RX processor 370, or the controller/processor 375 may execute the RACH component 198 and/or the preamble component 942 to receive the random access preamble 411 (e.g., PRACH message 1) from the UE 104. For example, the preamble component 942 may monitor the PRACH for the defined RACH preambles. Accordingly, the base station 102, the RX processor 370, or the controller/processor 375 executing the RACH component 198 or the preamble component 942 may provide means for receiving a random access preamble from a UE.

At block 720, the method 700 may include transmitting a physical downlink shared channel transport block including a RAR message including a single bit indication of whether repetition of a RA Msg 3 is indicated and a RAR UL grant including a TPC field indicating both a repetition factor and a TPC command. In an aspect, for example, the base station 102, the TX processor 316, or the controller/processor 375 may execute the RACH component 198 and/or the RAR UL grant component 944 to transmit a physical downlink shared channel transport block including a RAR UL grant including a single bit indication of whether repetition of a RA Msg 3 is indicated and a TPC field indicating both a repetition factor and a TPC command. Accordingly, the base station 102, the TX processor 316, or the controller/processor 375 executing the RACH component 198 or the preamble component 942 may provide means for transmitting a physical downlink shared channel transport block including a RAR UL grant including a single bit indication of whether repetition of a RA Msg 3 is indicated and a TPC field indicating both a repetition factor and a TPC command.

At block 730, the method 700 may include receiving the RA Msg 3 based on the repetition factor and the TPC command. In an aspect, for example, the base station 102, the RX processor 370, or the controller/processor 375 may execute the RACH component 198 and/or the receiving component 946 to receive the RA Msg 3 based on the repetition factor and the TPC command. For example, at sub-block 732, the receiving component 946 may receive the RA Msg 3 in a number of slots equal to the repetition factor. At sub-block 734, the receiving component 946 may combine the number of slots including the received RA Msg 3. Accordingly, the base station 102, the RX processor 370, or the controller/processor 375 executing the RACH component 198 or the preamble component 942 may provide means for receiving the RA Msg 3 based on the repetition factor and the TPC command.

Figure 8:
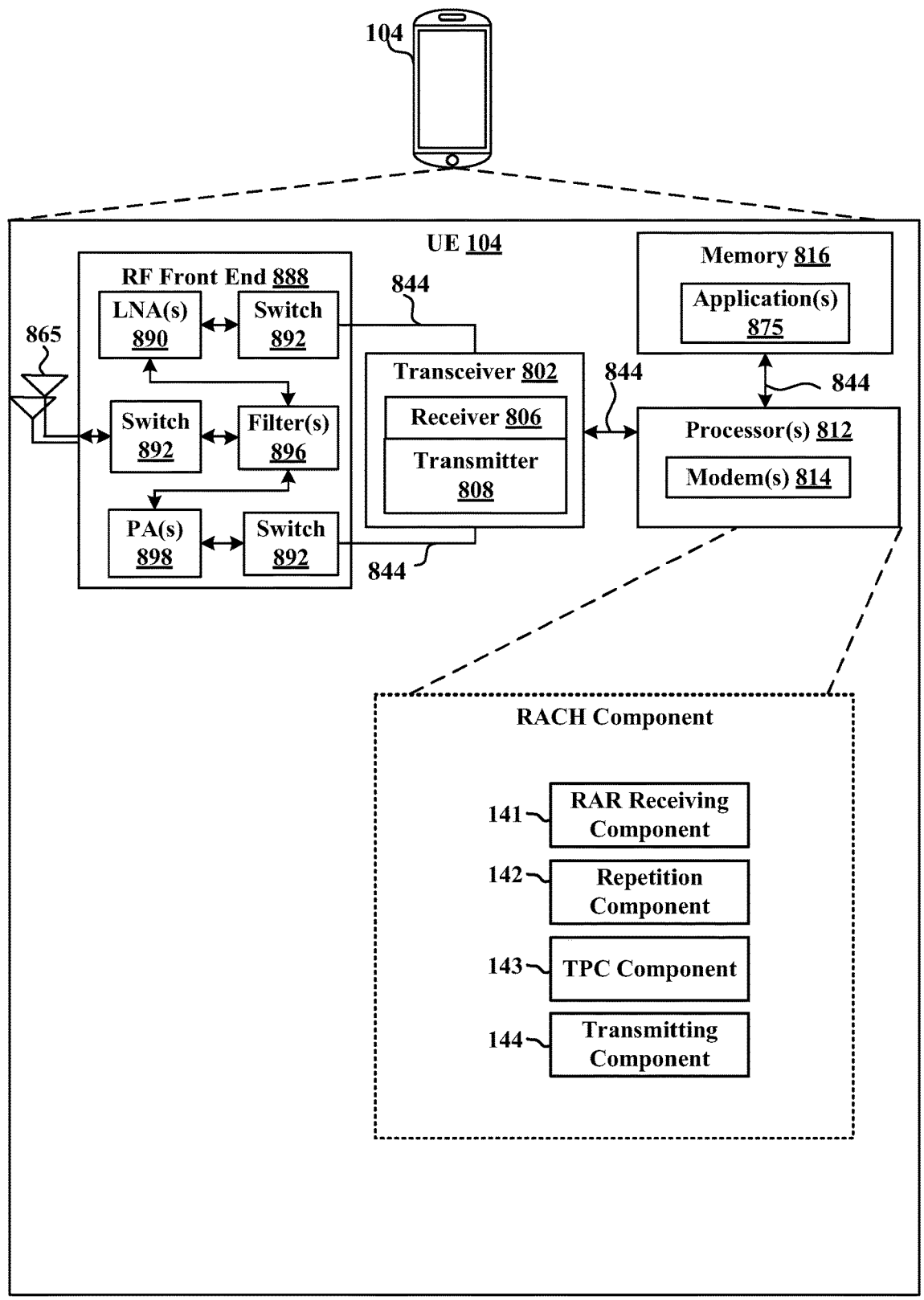
FIG. 8 is a schematic diagram of example components of the UE of FIG. 1.

Referring to FIG. 8, one example of an implementation of UE 104 may include a variety of components, some of which have already been described above, but including components such as one or more processors 812 and memory 816 and transceiver 802 in communication via one or more buses 844, which may operate in conjunction with modem 814, and RACH component 140 to enable one or more of the functions described herein related to transmitting a RA Msg 3 during a RACH procedure. Further, the one or more processors 812, modem 814, memory 816, transceiver 802, RF front end 888 and one or more antennas 865 may be configured to support voice and/or data calls (simultaneously or non-simultaneously) in one or more radio access technologies. The antennas 865 may include one or more antennas, antenna elements, and/or antenna arrays.

In an aspect, the one or more processors 812 may include a modem 814 that uses one or more modem processors. The various functions related to RACH component 140 may be included in modem 814 and/or processors 812 and, in an aspect, may be executed by a single processor, while in other aspects, different ones of the functions may be executed by a combination of two or more different processors. For example, in an aspect, the one or more processors 812 may include any one or any combination of a modem processor, or a baseband processor, or a digital signal processor, or a transmit processor, or a receiver processor, or a transceiver processor associated with transceiver 802. In other aspects, some of the features of the one or more processors 812 and/or modem 814 associated with RACH component 140 may be performed by transceiver 802.

Also, memory 816 may be configured to store data used herein and/or local versions of applications 875, RACH component 140 and/or one or more of subcomponents thereof being executed by at least one processor 812. Memory 816 may include any type of computer-readable medium usable by a computer or at least one processor 812, such as random access memory (RAM), read only memory (ROM), tapes, magnetic discs, optical discs, volatile memory, non-volatile memory, and any combination thereof. In an aspect, for example, memory 816 may be a non-transitory computer-readable storage medium that stores one or more computer-executable codes defining RACH component 140 and/or one or more of subcomponents thereof, and/or data associated therewith, when UE 104 is operating at least one processor 812 to execute RACH component 140 and/or one or more subcomponents thereof.

Transceiver 802 may include at least one receiver 806 and at least one transmitter 808. Receiver 806 may include hardware, firmware, and/or software code executable by a processor for receiving data, the code comprising instructions and being stored in a memory (e.g., computer-readable medium). Receiver 806 may be, for example, a radio frequency (RF) receiver. In an aspect, receiver 806 may receive signals transmitted by at least one base station 102. Additionally, receiver 806 may process such received signals, and also may obtain measurements of the signals, such as, but not limited to, Ec/Io, SNR, RSRP, RSSI, etc. Transmitter 808 may include hardware, firmware, and/or software code executable by a processor for transmitting data, the code comprising instructions and being stored in a memory (e.g., computer-readable medium). A suitable example of transmitter 808 may including, but is not limited to, an RF transmitter.

Moreover, in an aspect, UE 104 may include RF front end 888, which may operate in communication with one or more antennas 865 and transceiver 802 for receiving and transmitting radio transmissions, for example, wireless communications transmitted by at least one base station 102 or wireless transmissions transmitted by UE 104. RF front end 888 may be connected to one or more antennas 865 and may include one or more low-noise amplifiers (LNAs) 890, one or more switches 892, one or more power amplifiers (PAs) 898, and one or more filters 896 for transmitting and receiving RF signals.

In an aspect, LNA 890 may amplify a received signal at a desired output level. In an aspect, each LNA 890 may have a specified minimum and maximum gain values. In an aspect, RF front end 888 may use one or more switches 892 to select a particular LNA 890 and its specified gain value based on a desired gain value for a particular application.

Further, for example, one or more PA(s) 898 may be used by RF front end 888 to amplify a signal for an RF output at a desired output power level. In an aspect, each PA 898 may have specified minimum and maximum gain values. In an aspect, RF front end 888 may use one or more switches 892 to select a particular PA 898 and its specified gain value based on a desired gain value for a particular application.

Also, for example, one or more filters 896 may be used by RF front end 888 to filter a received signal to obtain an input RF signal. Similarly, in an aspect, for example, a respective filter 896 may be used to filter an output from a respective PA 898 to produce an output signal for transmission. In an aspect, each filter 896 may be connected to a specific LNA 890 and/or PA 898. In an aspect, RF front end 888 may use one or more switches 892 to select a transmit or receive path using a specified filter 896, LNA 890, and/or PA 898, based on a configuration as specified by transceiver 802 and/or processor 812.

As such, transceiver 802 may be configured to transmit and receive wireless signals through one or more antennas 865 via RF front end 888. In an aspect, transceiver 802 may be tuned to operate at specified frequencies such that UE 104 can communicate with, for example, one or more base stations 102 or one or more cells associated with one or more base stations 102. In an aspect, for example, modem 814 may configure transceiver 802 to operate at a specified frequency and power level based on the UE configuration of the UE 104 and the communication protocol used by modem 814.

In an aspect, modem 814 may be a multiband-multimode modem, which can process digital data and communicate with transceiver 802 such that the digital data is sent and received using transceiver 802. In an aspect, modem 814 may be multiband and be configured to support multiple frequency bands for a specific communications protocol. In an aspect, modem 814 may be multimode and be configured to support multiple operating networks and communications protocols. In an aspect, modem 814 may control one or more components of UE 104 (e.g., RF front end 888, transceiver 802) to enable transmission and/or reception of signals from the network based on a specified modem configuration. In an aspect, the modem configuration may be based on the mode of the modem and the frequency band in use. In another aspect, the modem configuration may be based on UE configuration information associated with UE 104 as provided by the network during cell selection and/or cell reselection.

Figure 9:
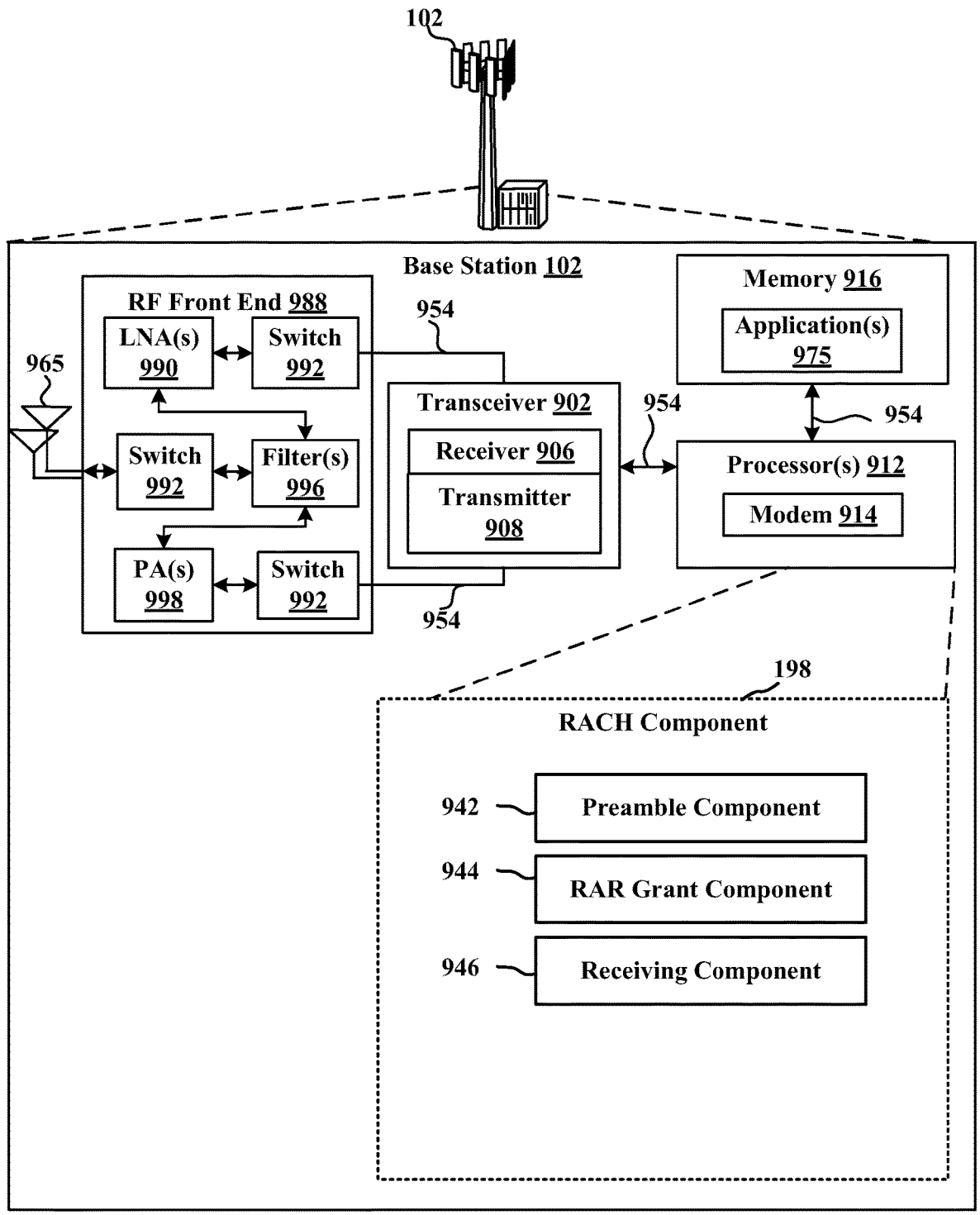
FIG. 9 is a schematic diagram of example components of the base station of FIG. 1.

Referring to FIG. 9, one example of an implementation of base station 102 may include a variety of components, some of which have already been described above, but including components such as one or more processors 912 and memory 916 and transceiver 902 in communication via one or more buses 954, which may operate in conjunction with modem 914 and RACH component 198 to enable one or more of the functions described herein related to receiving a RA Msg 3 during a RACH procedure.

The transceiver 902, receiver 906, transmitter 908, one or more processors 912, memory 916, applications 975, buses 954, RF front end 988, LNAs 990, switches 992, filters 996, PAs 998, and one or more antennas 965 may be the same as or similar to the corresponding components of UE 104, as described above, but configured or otherwise programmed for base station operations as opposed to UE operations.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

Some Further Example Clauses

Implementation examples are described in the following numbered clauses:

1. A method of wireless communication, comprising:
    receiving a random access response (RAR) message including a RAR uplink (UL) grant;
    determining, based on a single bit of the RAR message, whether repetition of a random access (RA) message (Msg) 3 is indicated;
    determining both of a repetition factor and a transmit power control (TPC) command for the RA Msg 3 based on the single bit and a TPC field of the RAR UL grant; and
    transmitting the RA Msg 3 based on the repetition factor and the TPC command.
2. The method of clause 1, wherein the single bit indicates no repetition of the RA Msg 3, and wherein determining the repetition factor and the TPC command comprises:
    determining that the repetition factor has a value of 1; and
    determining the TPC command based on all bits of the TPC field.
3. The method of clause 1, wherein the single bit indicates repetition of the RA Msg 3.
4. The method of clause 3, wherein determining both the repetition factor and the TPC command comprises determining whether the repetition factor has a value of 2 based on a first bit of the TPC field.
5. The method of clause 4, wherein determining both the repetition factor and the TPC command further comprises determining the TPC command based on remaining bits of the TPC field in response to determining that the value of the repetition factor is 2.
6. The method of clause 4, wherein determining both the repetition factor and the TPC command further comprises determining that the TPC command is full power and determining the value of the repetition factor based on remaining bits of the TPC field in response to determining that the value of the repetition factor is greater than 2.
7. The method of any of clauses 1-6, wherein the single bit is a bit of the RAR UL grant used for a CSI request in contention-free random access and for reserved use in contention-based random access.

8. The method of any of clauses 1-6, wherein the single bit is a dedicated field of the RAR UL grant.

9. The method of any of clauses 1-8, wherein transmitting the RA Msg 3 based on the repetition factor and the TPC command comprises repeating the RA Msg 3 over a number of slots equal to a value of the repetition factor.

10. The method of clause 9, wherein the number of slots equal to the value of the repetition factor are consecutive UL slots.

11. An apparatus for wireless communication, comprising:
a memory; and
at least one processor coupled to the memory and configured to:
receive a random access response (RAR) message including a RAR uplink (UL) grant;
determine, based on a single bit of the RAR message, whether repetition of a random access (RA) message (Msg) 3 physical is indicated;
determine both of a repetition factor and a transmit power control (TPC) command for the RA Msg 3 based on the single bit and a TPC field of the RAR UL grant; and
transmit the RA Msg 3 based on the repetition factor and the TPC command.

12. The apparatus of clause 11, wherein the single bit indicates no repetition of the RA Msg 3, and wherein the at least one processor is configured to:
determine that the repetition factor has a value of 1; and
determine the TPC command based on all bits of the TPC field.

13. The apparatus of clause 11, wherein the single bit indicates repetition of the RA Msg 3.

14. The apparatus of clause 13, wherein the at least one processor is configured to determine whether the repetition factor has a value of 2 based on a first bit of the TPC field.

15. The apparatus of clause 14, wherein the at least one processor is configured to determine the TPC command based on remaining bits of the TPC field in response to determining that the value of the repetition factor is 2.

16. The apparatus of clause 14, wherein the at least one processor is configured to determine that the TPC command is full power and determining the value of the repetition factor based on remaining bits of the TPC field in response to determining that the value of the repetition factor is greater than 2.

17. The apparatus of any of clauses 11-16, wherein the single bit is a bit of the RAR UL grant used for a CSI request in contention-free random access and for reserved use in contention-based random access.

18. The apparatus of any of clauses 11-16, wherein the single bit is a dedicated field of the RAR UL grant.

19. The apparatus of any of clauses 11-18, wherein the at least one processor is configured to repeat the RA Msg 3 over a number of slots equal to a value of the repetition factor.

20. The apparatus of clause 19, wherein the number of slots equal to the value of the repetition factor are consecutive UL slots.

21. An apparatus for wireless communication, comprising:
means for receiving a random access response (RAR) message including an uplink (UL) grant;
means for determining, based on a single bit of the RAR message, whether repetition of a random access (RA) message (Msg) 3 is indicated;
means for determining both of a repetition factor and a transmit power control (TPC) command for the RA Msg 3 based on the single bit and a TPC field of the RAR UL grant; and
means for transmitting the RA Msg 3 based on the repetition factor and the TPC command.

22. The apparatus of clause 21, wherein the single bit indicates no repetition of the RA Msg 3, and wherein the means for determining both of the repetition factor and the TPC command is configured to:
determine that the repetition factor has a value of 1; and
determine the TPC command based on all bits of the TPC field.

23. The apparatus of clause 21, wherein the single bit indicates repetition of the RA Msg 3.

24. The apparatus of clause 23, wherein the means for determining both of the repetition factor and the TPC command is configured to determine whether the repetition factor has a value of 2 based on a first bit of the TPC field.

25. The apparatus of clause 24, wherein the means for determining both of the repetition factor and the TPC command is configured to determine the TPC command based on remaining bits of the TPC field in response to determining that the value of the repetition factor is 2.

26. The apparatus of clause 24, wherein the means for determining both of the repetition factor and the TPC command is configured to determine that the TPC command is full power and determining the value of the repetition factor based on remaining bits of the TPC field in response to determining that the value of the repetition factor is greater than 2.

27. The apparatus of any of clauses 21-26, wherein the single bit is a bit of the RAR UL grant used for a CSI request in contention-free random access and for reserved use in contention-based random access.

28. The apparatus of any of clauses 21-26, wherein the single bit is a dedicated field of the RAR UL grant.

29. The apparatus of any of clauses 21-28, wherein the means for transmitting the RA Msg 3 based on the repetition factor and the TPC command is configured to repeat the RA Msg 3 over a number of slots equal to a value of the repetition factor.

30. The apparatus of clause 29, wherein the number of slots equal to the value of the repetition factor are consecutive UL slots.

31. A non-transitory computer-readable medium storing computer executable code, the code when executed by a processor cause the processor to:
receive a random access response (RAR) message including an uplink (UL) grant;
determine, based on a single bit of the RAR message, whether repetition of a random access (RA) message (Msg) 3 is indicated;
determine both of a repetition factor and a transmit power control (TPC) command for the RA Msg 3 based on the single bit and a TPC field of the RAR UL grant; and
transmit the RA Msg 3 based on the repetition factor and the TPC command.

32. The non-transitory computer-readable medium of clause 31, wherein the single bit indicates no repetition of the RA Msg 3, and wherein the code to determine both of the repetition factor and the TPC command comprises code to:
determine that the repetition factor has a value of 1; and
determine the TPC command based on all bits of the TPC field.
33. The non-transitory computer-readable medium of clause 31, wherein the single bit indicates repetition of the RA Msg 3.
34. The non-transitory computer-readable medium of clause 33, wherein the code to determine both of the repetition factor and the TPC command comprises code to determine whether the repetition factor has a value of 2 based on a first bit of the TPC field.
35. The non-transitory computer-readable medium of clause 34, wherein the code to determine both of the repetition factor and the TPC command comprises code to determine the TPC command based on remaining bits of the TPC field in response to determining that the value of the repetition factor is 2.
36. The non-transitory computer-readable medium of clause 34, wherein the code to determine both of the repetition factor and the TPC command comprises code to determine that the TPC command is full power and determining the value of the repetition factor based on remaining bits of the TPC field in response to determining that the value of the repetition factor is greater than 2.
37. The non-transitory computer-readable medium of any of clauses 31-36, wherein the single bit is a bit of the RAR UL grant used for a CSI request in contention-free random access and for reserved use in contention-based random access.
38. The non-transitory computer-readable medium of any of clauses 31-36, wherein the single bit is a dedicated field of the RAR UL grant.
39. The non-transitory computer-readable medium of any of clauses 31-38, wherein code to transmit comprises code to repeat the RA Msg 3 over a number of slots equal to a value of the repetition factor.
40. The non-transitory computer-readable medium of clause 39, wherein the number of slots equal to the value of the repetition factor are consecutive UL slots.
41. A method of wireless communication, comprising:
receiving a random access preamble from a UE;
transmitting a physical downlink shared channel transport block including a random access response (RAR) message including a single bit indication of whether repetition of a random access (RA) message (Msg) 3 is indicated and an uplink (UL) grant including a transmit power control (TPC) field indicating both a repetition factor and a TPC command; and
receiving the RA Msg 3 based on the repetition factor and the TPC command.
42. The method of clause 41, wherein the single bit indication indicates no repetition of the RA Msg 3, the repetition factor is 1, and all bits of the TPC field indicate a value of the TPC command.
43. The method of clause 41, wherein the single bit indication indicates repetition of the RA Msg 3.
44. The method of clause 43, wherein a first bit of the TPC field indicates that the repetition factor is 2 and remaining bits of the TPC field indicate a value of the TPC command.
45. The method of clause 43, wherein a first bit of the TPC field indicates that the repetition factor is greater than 2 and a value of the TPC command is full power and remaining bits of the TPC field indicate the repetition factor.
46. The method of any of clauses 41-45, wherein the single bit indication is a bit of the RAR UL grant used for a CSI request in contention-free random access and for reserved use in contention-based random access.
47. The method of any of clauses 41-45, wherein the single bit indication is a dedicated field of the RAR UL grant.
48. The method of any of clauses 41-47, wherein receiving the RA Msg 3 based on the repetition factor and the TPC command comprises:
receiving the RA Msg 3 in a number of slots equal to the repetition factor; and
combining the number of slots including the received RA Msg 3.
49. The method of clause 48, wherein the number of slots equal to the repetition factor are consecutive UL slots.
50. An apparatus for wireless communication, comprising:
a memory; and
at least one processor coupled to the memory and configured to:
receive a random access preamble from a UE;
transmit a physical downlink shared channel transport block including a random access response (RAR) message including a single bit indication of whether repetition of a random access (RA) message (Msg) 3 is indicated and an uplink (UL) grant including a transmit power control (TPC) field indicating both a repetition factor and a TPC command; and
receive the RA Msg 3 based on the repetition factor and the TPC command.
51. The apparatus of clause 50, wherein the single bit indication indicates no repetition of the RA Msg 3, the repetition factor is 1, and all bits of the TPC field indicate a value of the TPC command.
52. The apparatus of clause 50, wherein the single bit indication indicates repetition of the RA Msg 3.
53. The apparatus of clause 52, wherein a first bit of the TPC field indicates that the repetition factor is 2 and remaining bits of the TPC field indicate a value of the TPC command.
54. The apparatus of clause 52, wherein a first bit of the TPC field indicates that the repetition factor is greater than 2 and a value of the TPC command is full power and remaining bits of the TPC field indicate the repetition factor.
55. The apparatus of any of clauses 50-54, wherein the single bit indication is a bit of the RAR UL grant used for a CSI request in contention-free random access and for reserved use in contention-based random access.
56. The apparatus of any of clauses 50-54, wherein the single bit indication is a dedicated field of the RAR UL grant.
57. The apparatus of any of clauses 50-56, wherein the at least one processor is configured to:
receive the RA Msg 3 in a number of slots equal to the repetition factor; and
combine the number of slots including the received RA Msg 3.
58. The apparatus of clause 57, wherein the number of slots equal to the repetition factor are consecutive UL slots.

59. An apparatus for wireless communication, comprising:
   means for receiving a random access preamble from a UE;
   means for transmitting a physical downlink shared channel transport block including a random access response (RAR) message including a single bit indication of whether repetition of a random access (RA) message (Msg) 3 is indicated and an uplink (UL) grant including a transmit power control (TPC) field indicating both a repetition factor and a TPC command; and
   means for receiving the RA Msg 3 based on the repetition factor and the TPC command.

60. The apparatus of clause 59, wherein the single bit indication indicates no repetition of the RA Msg 3, the repetition factor is 1, and all bits of the TPC field indicate a value of the TPC command.

61. The apparatus of clause 59, wherein the single bit indication indicates repetition of the RA Msg 3.

62. The apparatus of clause 61, wherein a first bit of the TPC field indicates that the repetition factor is 2 and remaining bits of the TPC field indicate a value of the TPC command.

63. The apparatus of clause 61, wherein a first bit of the TPC field indicates that the repetition factor is greater than 2 and a value of the TPC command is full power and remaining bits of the TPC field indicate the repetition factor.

64. The apparatus of any of clauses 59-63, wherein the single bit indication is a bit of the RAR UL grant used for a CSI request in contention-free random access and for reserved use in contention-based random access.

65. The apparatus of any of clauses 59-63, wherein the single bit indication is a dedicated field of the RAR UL grant.

66. The apparatus of any of clauses 59-65, wherein the means for receiving the RA Msg 3 based on the repetition factor and the TPC command is configured to:
   receive the RA Msg 3 in a number of slots equal to the repetition factor; and
   combine the number of slots including the received RA Msg 3.

67. The apparatus of clause 66, wherein the number of slots equal to the repetition factor are consecutive UL slots.

68. A non-transitory computer-readable medium storing computer executable code, the code when executed by a processor cause the processor to:
   receive a random access preamble from a UE;
   transmit a physical downlink shared channel transport block including a random access response (RAR) message including a single bit indication of whether repetition of a random access (RA) message (Msg) 3 is indicated and an uplink (UL) grant including a transmit power control (TPC) field indicating both a repetition factor and a TPC command; and
   receive the RA Msg 3 based on the repetition factor and the TPC command.

69. The non-transitory computer-readable medium of clause 68, wherein the single bit indication indicates no repetition of the RA Msg 3, the repetition factor is 1, and all bits of the TPC field indicate a value of the TPC command.

70. The non-transitory computer-readable medium of clause 68, wherein the single bit indication indicates repetition of the RA Msg 3.

71. The non-transitory computer-readable medium of clause 70, wherein a first bit of the TPC field indicates that the repetition factor is 2 and remaining bits of the TPC field indicate a value of the TPC command.

72. The non-transitory computer-readable medium of clause 70, wherein a first bit of the TPC field indicates that the repetition factor is greater than 2 and a value of the TPC command is full power and remaining bits of the TPC field indicate the repetition factor.

73. The non-transitory computer-readable medium of any of clauses 68-72, wherein the single bit indication is a bit of the RAR UL grant used for a CSI request in contention-free random access and for reserved use in contention-based random access.

74. The non-transitory computer-readable medium of any of clauses 68-72, wherein the single bit indication is a dedicated field of the RAR UL grant.

75. The non-transitory computer-readable medium of any of clauses 68-74, wherein the code to receive the RA Msg 3 comprises code to:
   receive the RA Msg 3 in a number of slots equal to the repetition factor; and
   combine the number of slots including the received RA Msg 3.

76. The non-transitory computer-readable medium of clause 75, wherein the number of slots equal to the repetition factor are consecutive UL slots.

What is claimed is:

1. A method of wireless communication, comprising:
   receiving a random access response (RAR) message including a RAR uplink (UL) grant;
   determining, based on a single bit of the RAR message, whether repetition of a random access (RA) message (Msg) 3 is indicated, wherein the single bit indicates repetition of the RA Msg 3;
   determining both of a repetition factor and a transmit power control (TPC) command for the RA Msg 3 based on the single bit and a TPC field of the RAR UL grant, determining both the repetition factor and the TPC command comprises identifying the repetition factor based on a first bit of the TPC field; and
   transmitting the RA Msg 3 based on the repetition factor and the TPC command.

2. The method of claim 1, wherein the single bit indicates no repetition of the RA Msg 3, and wherein determining the repetition factor and the TPC command comprises:
   determining that the repetition factor has a value of 1; and
   determining the TPC command based on all bits of the TPC field.

3. The method of claim 1, wherein identifying the repetition factor includes determining whether the repetition factor has a value of 2 based on the first bit of the TPC field.

4. The method of claim 1, wherein determining both the repetition factor and the TPC command further comprises determining the TPC command based on remaining bits of the TPC field in response to determining that the value of the repetition factor is 2.

5. The method of claim 1, wherein determining both the repetition factor and the TPC command further comprises determining that the TPC command is full power and determining the value of the repetition factor based on remaining bits of the TPC field in response to determining that the value of the repetition factor is greater than 2.

6. The method of claim 1, wherein the single bit is a bit of the RAR UL grant used for a CSI request in contention-free random access and for reserved use in contention-based random access.

7. The method of claim 1, wherein the single bit is a dedicated field of the RAR UL grant.

8. The method of claim 1, wherein transmitting the RA Msg 3 based on the repetition factor and the TPC command comprises repeating the RA Msg 3 over a number of slots equal to a value of the repetition factor.

9. The method of claim 8, wherein the number of slots equal to the value of the repetition factor are consecutive UL slots.

10. An apparatus for wireless communication, comprising:
a memory; and
at least one processor coupled to the memory and configured to:
receive a random access response (RAR) message including a RAR uplink (UL) grant;
determine, based on a single bit of the RAR message, whether repetition of a random access (RA) message (Msg) 3 physical is indicated, wherein the single bit indicates repetition of the RA Msg 3;
determine both of a repetition factor and a transmit power control (TPC) command for the RA Msg 3 based on the single bit and a TPC field of the RAR UL grant, wherein to determine both of the repetition factor and the TPC command, the at least one processor is further configured to determine the repetition factor based on a first bit of the TPC field; and
transmit the RA Msg 3 based on the repetition factor and the TPC command.

11. The apparatus of claim 10, wherein the single bit indicates no repetition of the RA Msg 3, and wherein the at least one processor is configured to:
determine that the repetition factor has a value of 1; and
determine the TPC command based on all bits of the TPC field.

12. The apparatus of claim 10, wherein identifying the repetition factor includes determining whether the repetition factor has a value of 2 based on the first bit of the TPC field.

13. The apparatus of claim 10, wherein the at least one processor is configured to determine the TPC command based on remaining bits of the TPC field in response to determining that the value of the repetition factor is 2.

14. The apparatus of claim 10, wherein the at least one processor is configured to determine that the TPC command is full power and determining the value of the repetition factor based on remaining bits of the TPC field in response to determining that the value of the repetition factor is greater than 2.

15. The apparatus of claim 10, wherein the single bit is a bit of the RAR UL grant used for a CSI request in contention-free random access and for reserved use in contention-based random access.

16. The apparatus of claim 10, wherein the single bit is a dedicated field of the RAR UL grant.

17. The apparatus of claim 10, wherein the at least one processor is configured to repeat the RA Msg 3 over a number of slots equal to a value of the repetition factor.

18. The apparatus of claim 17, wherein the number of slots equal to the value of the repetition factor are consecutive UL slots.

19. A method of wireless communication, comprising:
receiving a random access preamble from a UE;
transmitting a physical downlink shared channel transport block including a random access response (RAR) message including a single bit indication of whether repetition of a random access (RA) message (Msg) 3 is indicated and an uplink (UL) grant including a transmit power control (TPC) field indicating both a repetition factor and a TPC command, wherein the single bit indication indicates repetition of the RA Msg 3, and wherein a first bit of the TPC field indicates the repetition factor and remaining bits of the TPC field indicate a value of the TPC command; and
receiving the RA Msg 3 based on the repetition factor and the TPC command.

20. The method of claim 19, wherein the single bit indication indicates no repetition of the RA Msg 3, the repetition factor is 1, and all bits of the TPC field indicate a value of the TPC command.

21. The method of claim 19, wherein the first bit of the TPC field indicates that the repetition factor is 2.

22. The method of claim 19, wherein a first bit of the TPC field indicates that the repetition factor is greater than 2 and a value of the TPC command is full power and remaining bits of the TPC field indicate the repetition factor.

23. The method of claim 19, wherein the single bit indication is a bit of the RAR UL grant used for a CSI request in contention-free random access and for reserved use in contention-based random access.

24. The method of claim 19, wherein the single bit indication is a dedicated field of the RAR UL grant.

25. The method of claim 19, wherein receiving the RA Msg 3 based on the repetition factor and the TPC command comprises:
receiving the RA Msg 3 in a number of slots equal to the repetition factor; and
combining the number of slots including the received RA Msg 3.

26. The method of claim 25, wherein the number of slots equal to the repetition factor are consecutive UL slots.

27. An apparatus for wireless communication, comprising:
a memory; and
at least one processor coupled to the memory and configured to:
receive a random access preamble from a UE;
transmit a physical downlink shared channel transport block including a random access response (RAR) message including a single bit indication of whether repetition of a random access (RA) message (Msg) 3 is indicated and an uplink (UL) grant including a transmit power control (TPC) field indicating both a repetition factor and a TPC command, wherein the single bit indication indicates repetition of the RA Msg 3, and wherein a first bit of the TPC field indicates the repetition factor and remaining bits of the TPC field indicate a value of the TPC command; and
receive the RA Msg 3 based on the repetition factor and the TPC command.

* * * * *